United States Patent
Yokono

(10) Patent No.: US 6,223,250 B1
(45) Date of Patent: *Apr. 24, 2001

(54) CARD ARRAY APPARATUS FOR MOUNTING IN A PERSONAL COMPUTER

(75) Inventor: Masayuki Yokono, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/666,936

(22) Filed: Jun. 19, 1996

(30) Foreign Application Priority Data

Jun. 22, 1995 (JP) ................................... 7-155678

(51) Int. Cl.⁷ ............................. G06F 1/16; G06F 13/00
(52) U.S. Cl. ........................ 711/114; 710/74; 710/104
(58) Field of Search ........................... 398/822; 361/684, 361/688, 818, 625–686; 710/8–19, 72, 74, 101–104; 711/111–114

(56) References Cited

U.S. PATENT DOCUMENTS

| | | | |
|---|---|---|---|
| 5,058,004 | * 10/1991 | Ravid | 395/822 |
| 5,299,089 | * 3/1994 | Lwee | 361/684 |
| 5,324,204 | * 6/1994 | Lwee | 439/64 |
| 5,334,046 | * 8/1994 | Brouillette et al. | 439/540 |
| 5,398,158 | * 3/1995 | Fisher et al. | 361/685 |
| 5,428,762 | * 6/1995 | Curren et al. | 395/425 |
| 5,430,617 | * 7/1995 | Hsu | 361/818 |
| 5,528,161 | * 6/1996 | Liken et al. | 324/760 |
| 5,628,028 | * 5/1997 | Michelson | 395/828 |
| 5,661,636 | * 8/1997 | Onoda et al. | 361/685 |
| 5,671,197 | * 9/1997 | Matsuda et al. | 369/32 |
| 5,680,126 | * 10/1997 | Kikinis | 341/22 |
| 5,680,579 | * 10/1997 | Young et al. | 395/484 |
| 5,715,410 | * 2/1998 | Kim | 395/309 |
| 5,727,184 | * 3/1998 | Richter et al. | 395/500 |
| 5,745,771 | * 4/1998 | Ohyama et al. | 710/262 |
| 5,822,184 | * 10/1998 | Rabinovitz | 361/685 |

* cited by examiner

Primary Examiner—Christopher B. Shin
(74) Attorney, Agent, or Firm—Staas & Halsey LLP

(57) ABSTRACT

A card array apparatus includes a card slot body having slots in which a plurality of PC cards having the same function should be set, and a card control unit for controlling the plurality PC cards set in the slots of the card slot body as a single unit corresponding to the same function based on a command supplied from an external system.

23 Claims, 15 Drawing Sheets

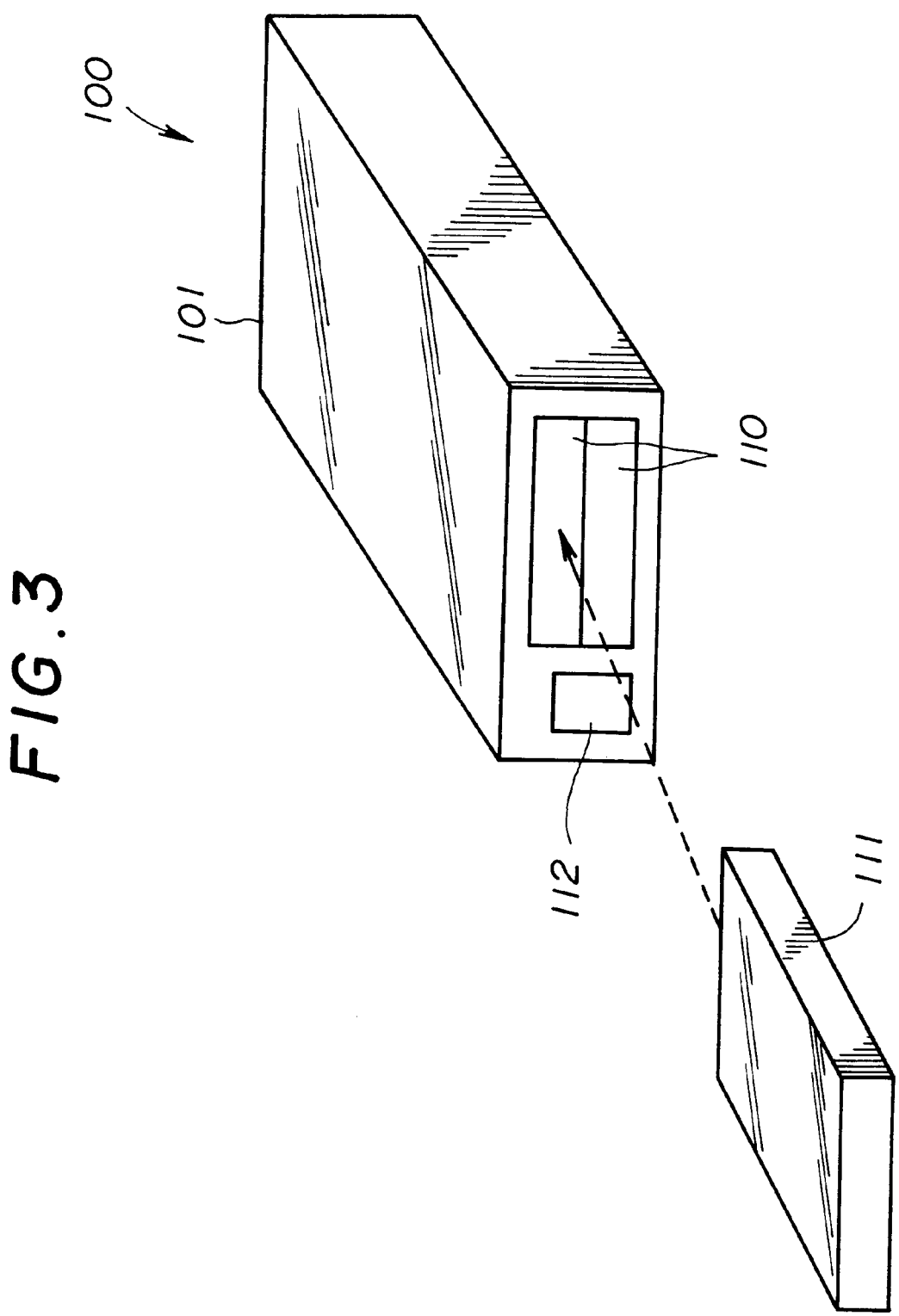

CARD ARRAY APPARATUS FOR MOUNTING IN A PERSONAL COMPUTER

BACKGROUND OF THE INVENTION (1) Field of the Invention

The present invention generally relates to a card array apparatus, and more particularly to a card array apparatus in which a plurality of cards having the same function, such as a hard disk, can be set and a personal computer in which the card array apparatus is mounted.

(2) Description of the Related Art

A high performance disk server carries out services using a disk array apparatus. The disk array apparatus includes a plurality of hard disk units which are operated as a single hard disk system. There are five types of control methods (RAID 1 through 5) for controlling the disk array apparatus. Due to each type of control method, the disk array apparatus has high performance and high reliability. As a result, for example, even if the disk array apparatus is being operated, a hard disk unit which has malfunctioned can be changed to a new one.

A disk server having a disk array apparatus may be formed as shown in FIG. 1. Referring to FIG. 1, a disk array apparatus 10, formed of a plurality of hard disk units (HDD1 through HDD5), and a disk array controller 20 are mounted in a body of a disk server 30. The disk array apparatus 10 and the disk array controller 20 are connected to each other by a standard bus interface. The disk server having the disk array apparatus may be also formed as shown in FIG. 2. Referring to FIG. 2, the disk array apparatus 10 and the disk array controller 20 are not mounted in the body of the disk server 30, but mounted in a disk array sub-system 32. The disk array controller 20 is connected to a disk controller 22 provided in the body of the disk server 30 by a general purpose interface such as a SCSI.

Each of the hard disk units (HD) of the disk array apparatus 10 is formed based on a 3.5-inch hard disk or a 5-inch hard disk, so that the disk array apparatus 10 including a plurality of hard disk units is relatively large. Thus, the conventional disk array apparatus can not be applied to a personal computer (e.g, a desktop computer).

Further, the conventional disk array apparatus is formed on the assumption that the respective hard disk units are fixed therein. Thus, to be capable of setting and removing a hard disk unit in and from the disk array apparatus which is in an active state (an active setting/removing operation of the hard disk unit), a unit exclusively for the active setting/removing operation of the hard disk unit is needed. However, units for the exclusive active setting/removing operation of the hard disk unit are designed by individual manufactures of the disk array apparatus. Thus, a unit exclusively for the active setting/removing operation of the hard disk unit does not have compatibility with other hard disk units.

SUMMARY OF THE INVENTION

Accordingly, a general object of the present invention is to provide a novel and useful card array apparatus in which the disadvantages of the aforementioned prior art are eliminated.

A specific object of the present invention is to provide a card array apparatus in which a plurality of cards having the same function, such as a hard disk, can be set.

Another object of the present invention is to provide a card array apparatus formed as a disk array apparatus which can be mounted in a personal computer.

Another object of the present invention is to provide a card array apparatus formed as a disk array apparatus in which respective hard disk units can be set in and removed from the disk array apparatus being in an active state.

Another object of the present invention is to provide a card array apparatus which can be formed as a disk array apparatus including hard disk units which provide a high level of compatibility.

The above objects of the present invention are achieved by a card array apparatus comprising: a card slot body having slots in which a plurality of PC cards having the same function can be set; and a card control unit for controlling the plurality of PC cards set in the slots of the card slot body as a single unit corresponding to the same function based on a command supplied from an external system.

According to the present invention, the PC cards having the same function can be set in the card array apparatus, and the PC cards are controlled as a single unit corresponding to the same function.

Since the card array apparatus is formed of the PC cards which are standardized by the PCMCIA/JEIDA (PCMCIA: Personal Computer Memory Card International Association; JEIDA: Japan Electronic Industry Development Association) so as to be applicable to a personal computer, a disk array apparatus which is mounted in a personal computer can be formed using the card array apparatus according to the present invention.

Since the PC cards have been designed as cards which can be freely set in and removed from slots, PC cards having hard disk functions can be set in and removed from the card array apparatus (the disk array apparatus) which is in the active state.

Further, since the PC cards are standardized by the PCMCIA/JEIDA, the card array apparatus can be formed as a disk array apparatus including hard disk units having increased compatibility.

Further, a specific object of the present invention is to provide a personal computer in which the card array apparatus described above is mounted.

The object of the present invention is achieved by a personal computer comprising: a card array apparatus; and a control system controlling the card array apparatus, wherein the card array apparatus comprises: a card slot body having slots in which a plurality of PC cards having the same function can be set; and a card control unit for controlling the plurality of PC cards set in the slots of the card slot body as a single unit corresponding to the same function based on a command supplied from the control system.

According to the present invention, a personal computer in which the card array apparatus is mounted can be made.

BRIEF DESCRIPTION OF THE DRAWINGS

Other objects, features and advantages of the present invention will apparent from the following description when read in conjunction with the accompanying drawings, in which:

FIG. 3 is a diagram illustrating an external view of a disk array apparatus according to an embodiment of the present invention;

DETAILED DESCRIPTION OF THE PREFERRED EMBODIMENTS

A description will now be given of an embodiment of the present invention.

A card array apparatus according to an embodiment of the present invention has a typical external view as shown in FIG. 3. In the embodiment, the card array apparatus is formed as a disk array apparatus.

Figure 1:
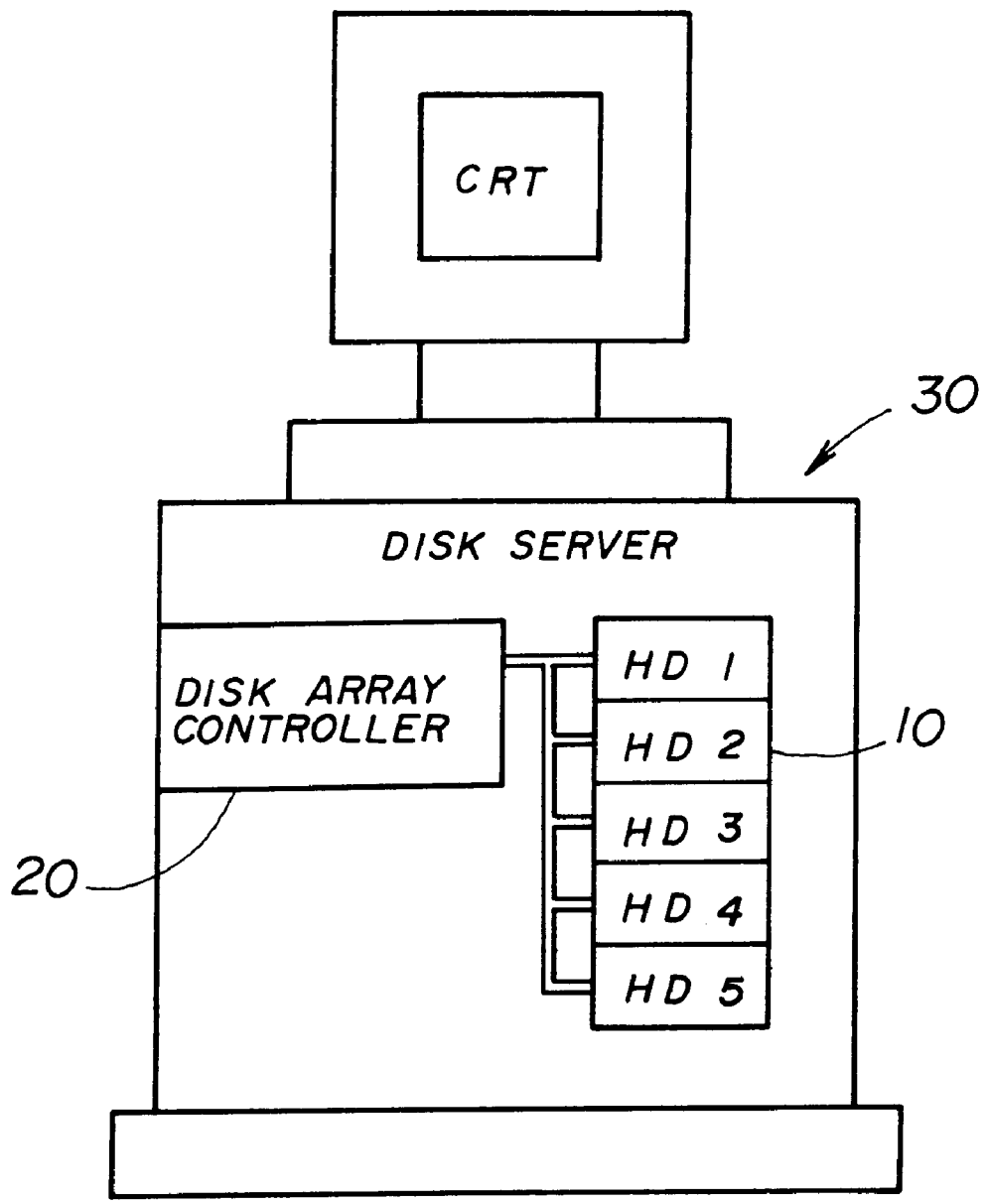
FIG. 1 is a diagram illustrating a conventional disk server in which a disk array is mounted.
Figure 2:
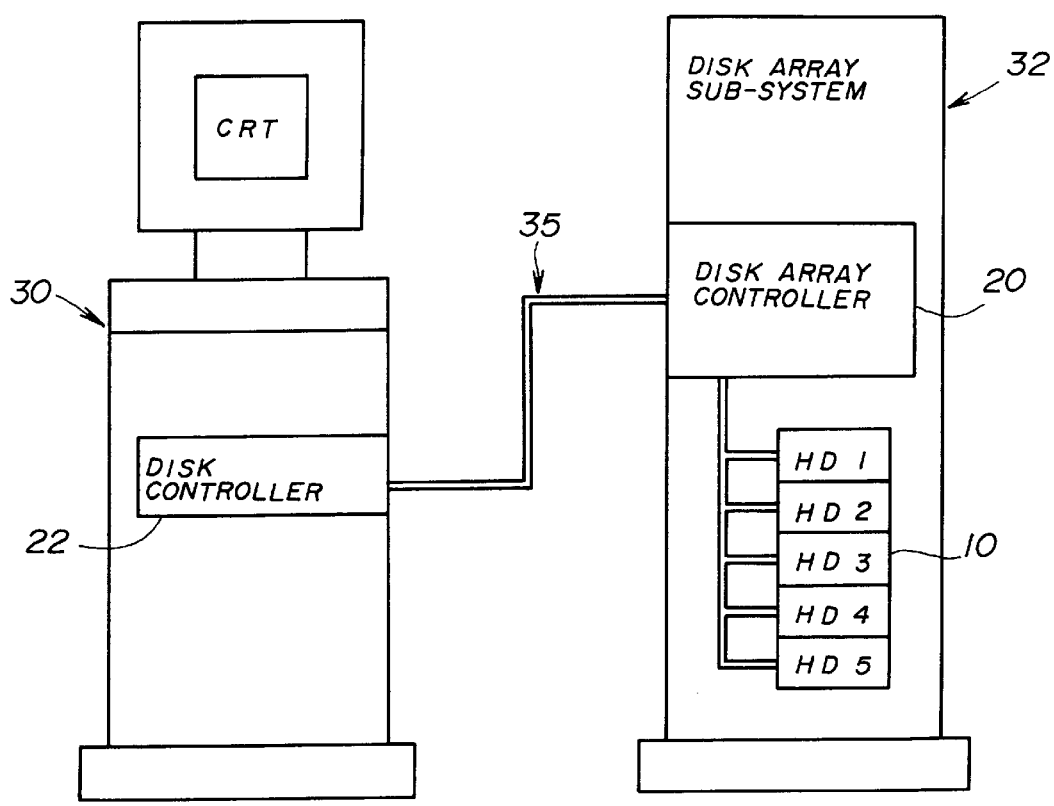
FIG. 2 is a diagram illustrating a conventional disk server connected to a disk array sub-system including the disk array apparatus.
Figure 4A:
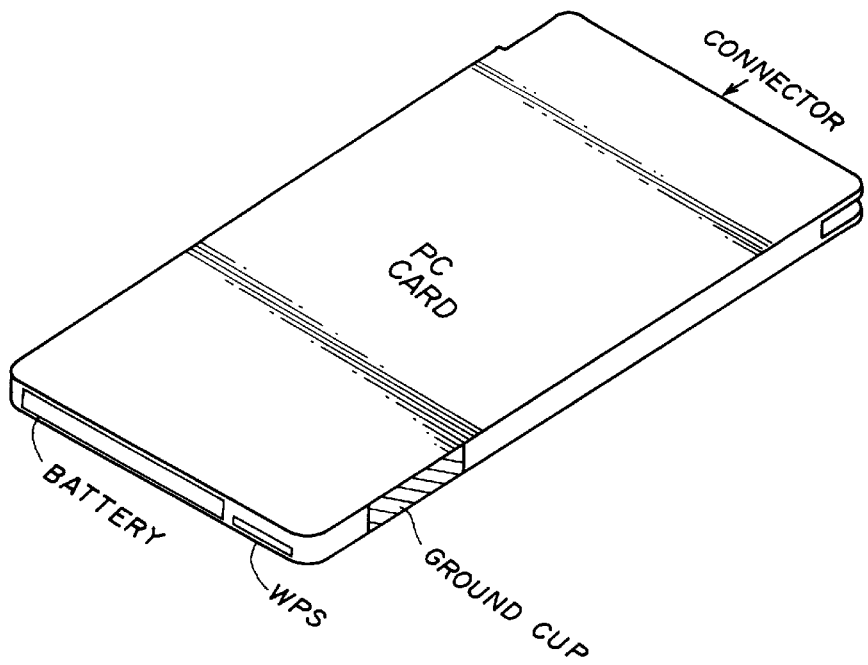
FIGS. 4A, 4B and 4C are diagrams illustrating PC cards standardized by a PCMCIA/JEIDA interface.
Figure 4B:
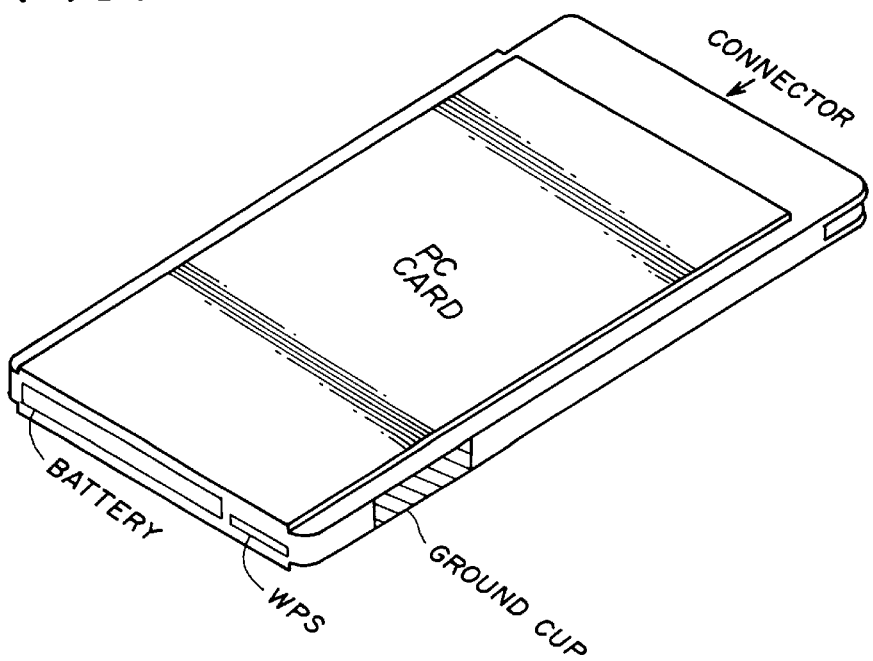
Figure 4C:
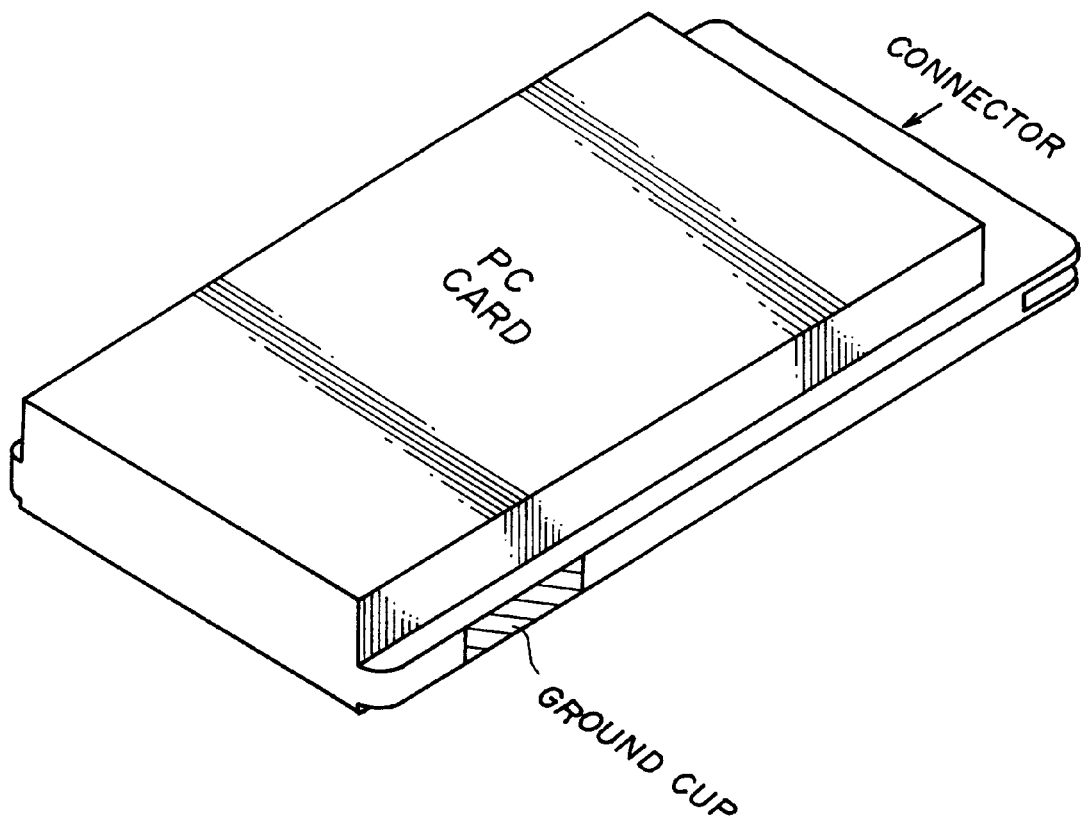

Referring to FIG. 3, a disk array apparatus 100 has a card slot body 101. The card slot body 101 has a plurality of slots 110 into each of which a PC card 111 can be set. The PC card can be detachably connected to a connector provided in the slot 110. The PC card 111 and the connector are standardized by the PCMCIA/JEIDA. Three types of PC cards as shown in FIGS. 4A, 4B and 4C may be used for the card array apparatus. FIG. 4A shows a type I PC card, FIG. 4B shows a type II PC card, and FIG. 4C shows a type III PC card. A hard disk unit is formed, for example, in a type III PC card (The hard disk unit may be also formed in a type I PC card and a type II PC card). Returning to FIG. 3, an indicator 112 is provided near the slots 110 on a front surface of the card slot body 101. In a case where the PC card 111 of the hard disk unit is set in each of the slots 110, the indicator 112 indicates whether hard disk units in the PC cards are normally operated. A card array controller for controlling functional units, such as hard disk units, provided in the PC cards 111 may be mounted in the card slot body 101.

Figure 5:
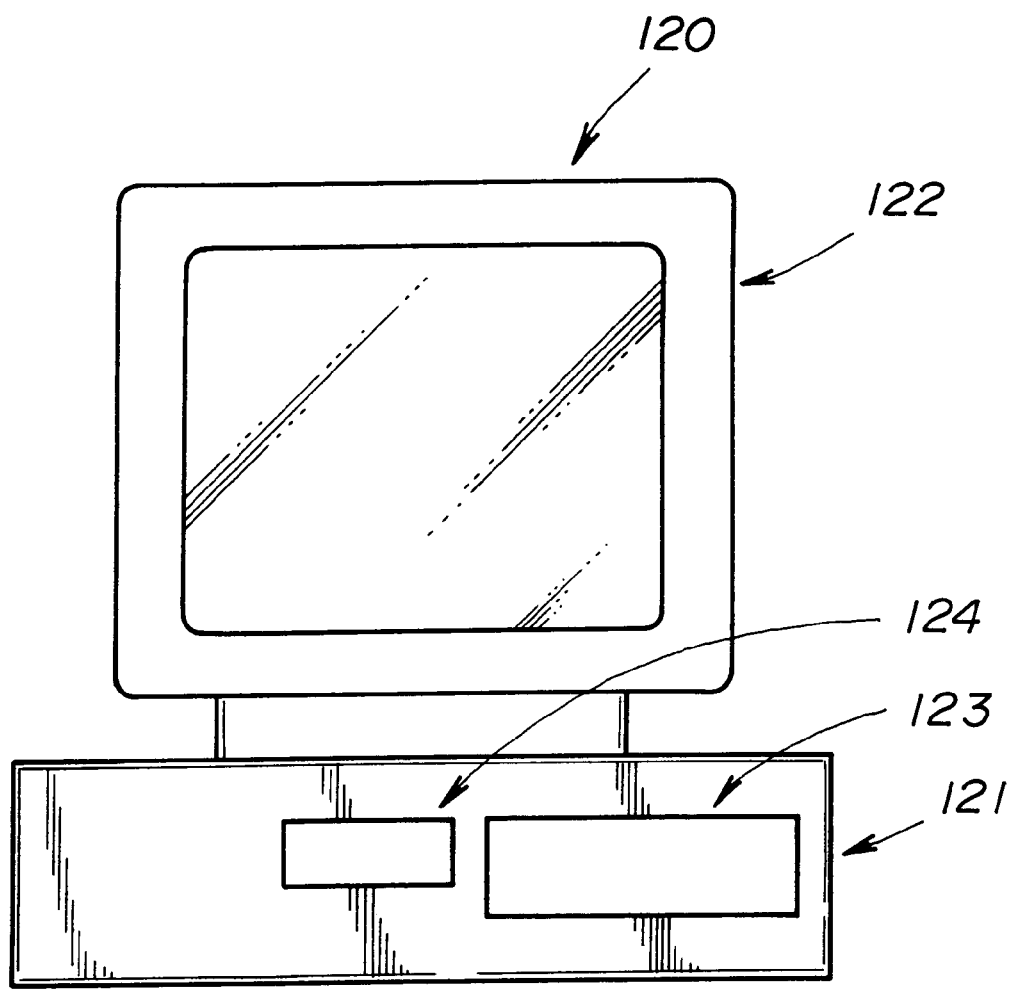
FIG. 5 is a diagram illustrating a personal computer having extended slots in which the disk array apparatuses shown in FIGS. 6A, 6B, 7A and 7B can be mounted.

A personal computer, such as a desktop computer, is formed as shown in FIG. 5. Referring to FIG. 5, the desktop computer 120 (as the personal computer) has a computer body 121 and a CRT display unit 122. The computer body 121 normally has one or more spaces in which a floppy disk drive unit, a CD-ROM unit, an MO drive unit and the like are mounted. In a typical example, an expansion slot 123 (a so-called 5-inches bay) and an expansion slot 124 (a so-called 3.5-inches bay) are formed in the computer body 121.

The typical 5-inches bay 123 used, for example, to mount a 5-inches disk unit has the following dimensions.

WIDTH: 148 mm
HEIGHT: 42 mm
DEPTH: 208 mm

The depth of 208 mm corresponds to the depth of the typical type of CD-ROM drive unit.

The typical 3.5-inch bay 124 used, for example, to mount a 3.5-inches disk unit has the following dimensions.

WIDTH: 101 mm
HEIGHT: 25 mm
DEPTH: 160 mm

The depth of 160 mm corresponds to the depth of the typical type of a magneto optical (MO) drive unit.

Figure 6A:
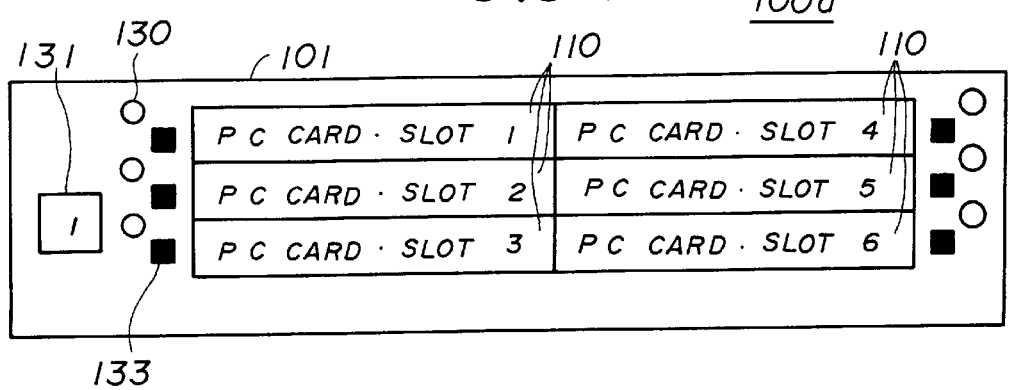
FIGS. 6A and 6B are diagrams illustrating a disk array apparatus according to an embodiment of the present invention.
Figure 6B:
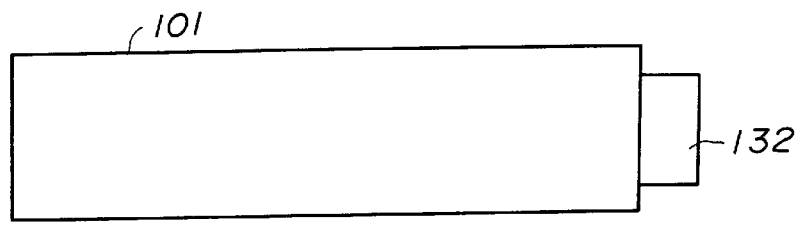

A card array apparatus which can be mounted in the 5-inches bay 123 of the computer body 121 is shown in FIGS. 6A and 6B.

Referring to FIG. 6A, six slots 110 (No.1–No.6) are provided in the card slot body 101 of the card array apparatus 100a. Access lamps 130 and eject buttons 133 are provided on the front surface of the card slot body 101 so as to be adjacent to the respective slots 110. The access lamps 130 indicate whether PC cards set in the respective slots 110 are accessed. The eject buttons 133 are operated to eject PC cards from the corresponding slots 110. A state indicator 131 is also provided on the front surface of the card slot body 101. In a case where PC cards for the hard disk units are set in some or all of the slots 110, the state indicator 131 indicates ID information of the hard disk units which malfunction. Card connectors standardized as connectors to which the PC cards are to be connected are mounted at the bottom of the respective slots 110. The respective card connectors are electrically connected to a connector 132 provided on a rear surface of the card slot body 101 as shown in FIG. 6B. The connector 132 is connected to a predetermined unit in the computer body 121.

Figure 7A:
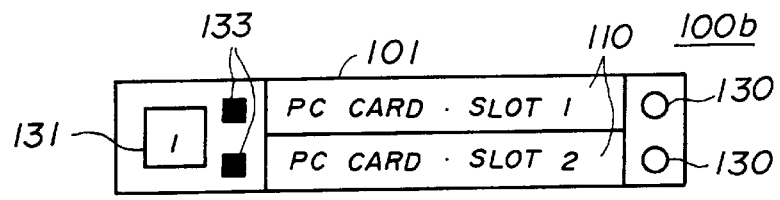
FIGS. 7A and 7B are diagrams illustrating the disk array apparatus according to another embodiment of the present invention.
Figure 7B:
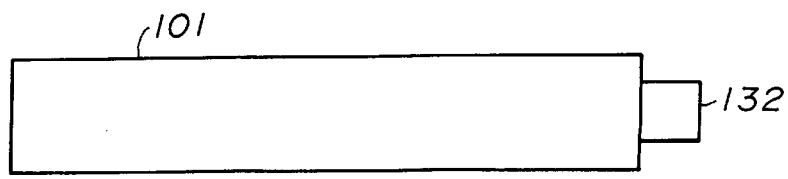

A card array apparatus which can be mounted in the 3.5-inches bay 124 of the computer body 121 is shown in FIGS. 7A and 7B. In FIGS. 7A and 7B, those parts which are the same as those shown in FIGS. 6A and 6B are given the same reference numbers and will not be explained in detail.

Referring to FIGS. 7A and 7B, two slots 110 are provided in the card slot body 101 of the card array apparatus 100b and the connector 132 is provided on the rear surface of the card slot body 101. The card array apparatus 100b is provided with the access lamps 130, the state indicator 131 and the eject buttons 133 in the same manner as those shown in FIGS. 6A and 6B.

Figure 8:
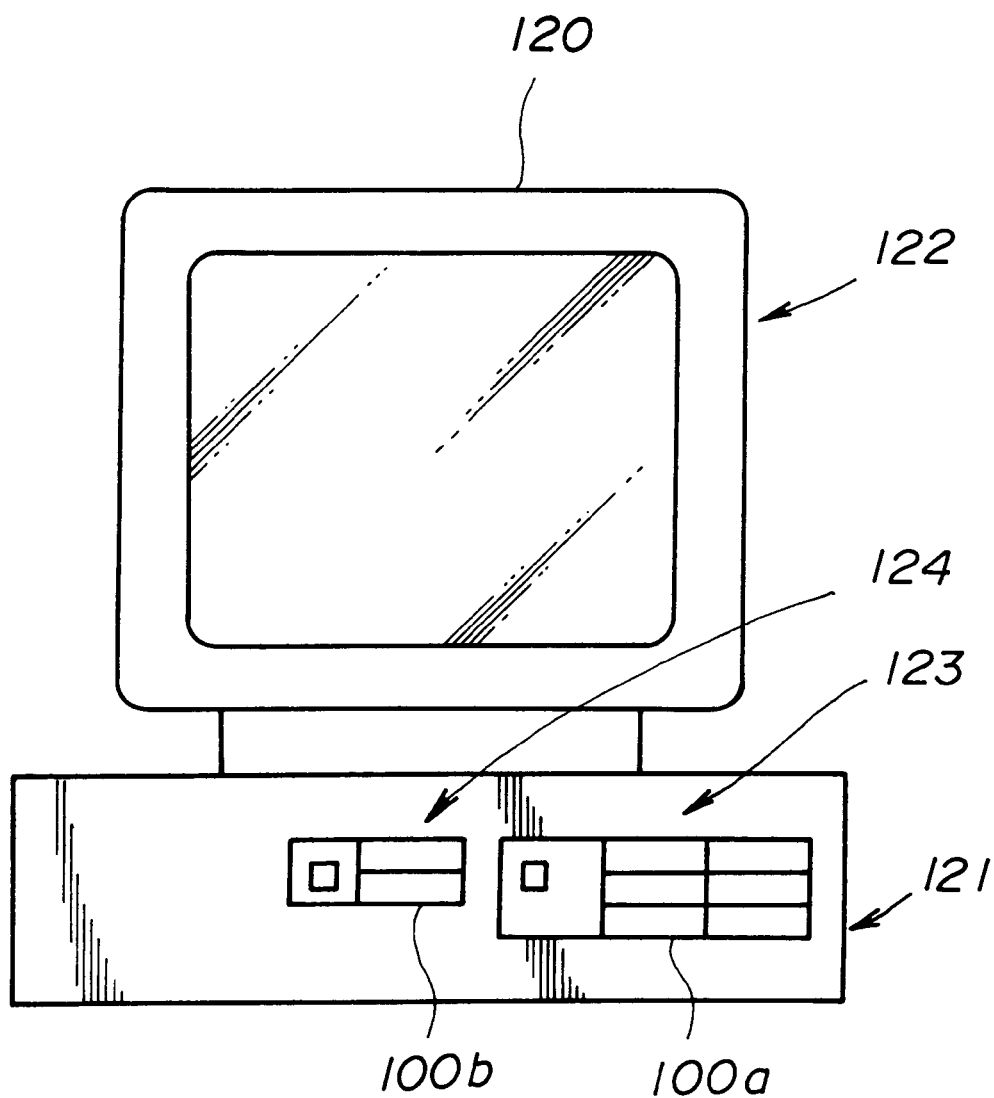
FIG. 8 is a diagram illustrating a personal computer in which the disk array apparatus shown in FIGS. 6A, 6B, 7A and 7B are mounted.

The card array apparatus 100a and 100b as described above may be respectively mounted in the 5-inches bay 123 and the 3.5-inches bay 124 as shown in FIG. 8. In this state, PC cards can be set in and ejected from the card slot apparatus 100a and 100b by operations at the front side of the computer body 121.

The PC cards 111 in which hard disk units are provided may be set in some or all of the slots 110 of the card slot apparatuses 100a and 100b. For example, in a case where PC cards 111 of the disk units are set in all of the slots 110 of the card apparatus 100a, a control system of the disk array apparatus 100a is provided as shown in FIG. 9.

Figure 9:
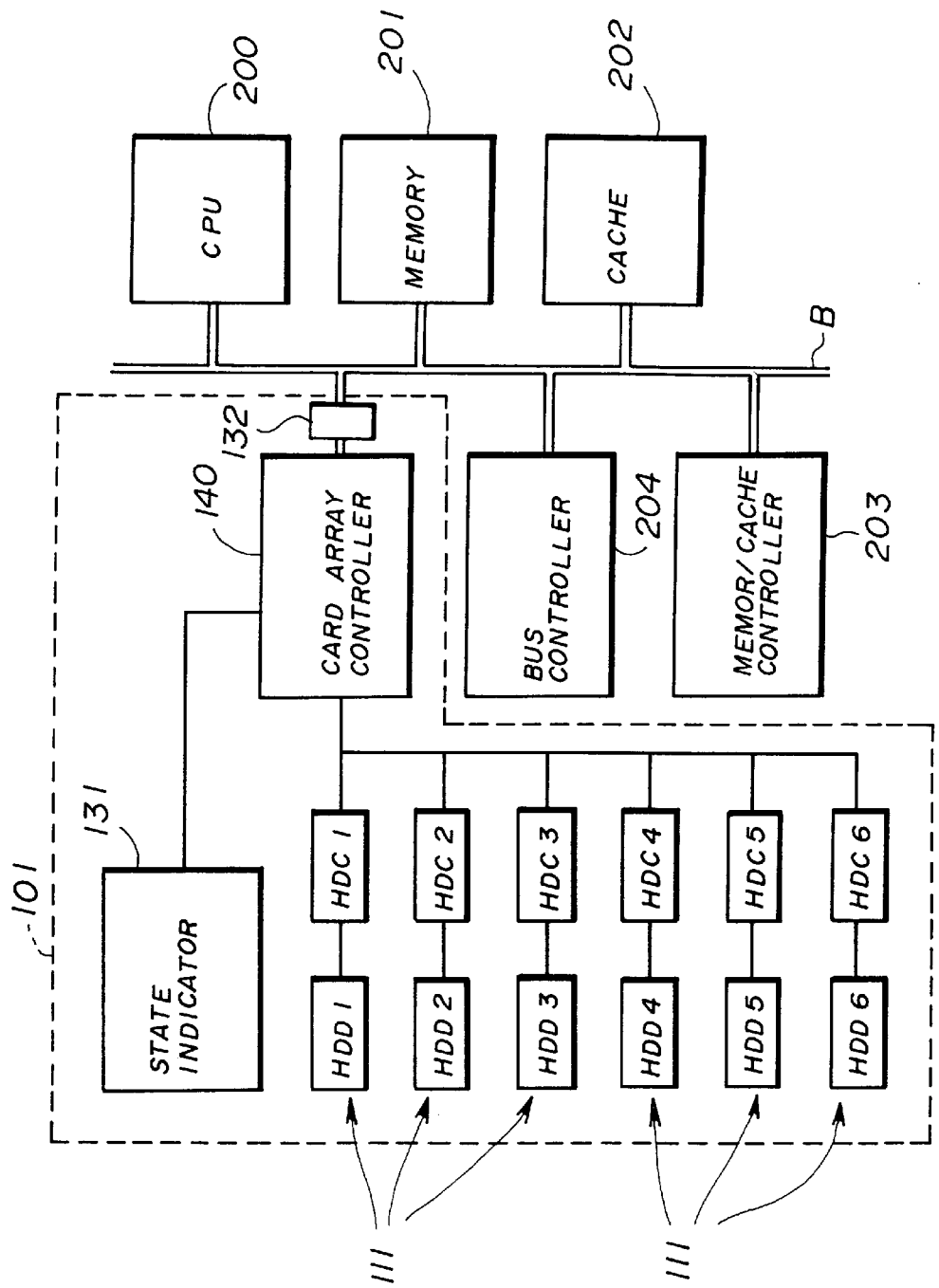
FIG. 9 is a block diagram illustrating an aspect of structures of the disk array apparatus and the personal computer coupled to each other.

Referring to FIG. 9, a card array controller 140 is provided in the card slot body 101. The card array controller 140 controls the PC cards 111 set in the slots 110 and the state indicator 131. Each of the PC cards 111 functions as a hard disk unit. That is, the card array apparatus 100a functions as a disk array apparatus. The card array controller 140 is connected, via the connector 132, to a bus B in a control system of the desktop computer 120. The control system of the desktop computer 120 has a CPU (Central Processing Unit) 200, a memory unit 201, a cache memory 202, a memory/cache controller 203 and a bus controller 204 all of which are connected to the bus B.

In this embodiment, each of the PC cards 111 is referred to as a hard disk card 111 at need. The hard disk card 111 is formed of disk drive unit (HDD) and a disk controller (HDC). The disk controllers (HDC) of the respective hard disk cards 111 are coupled to the card array controller 140 in parallel.

Figure 10:
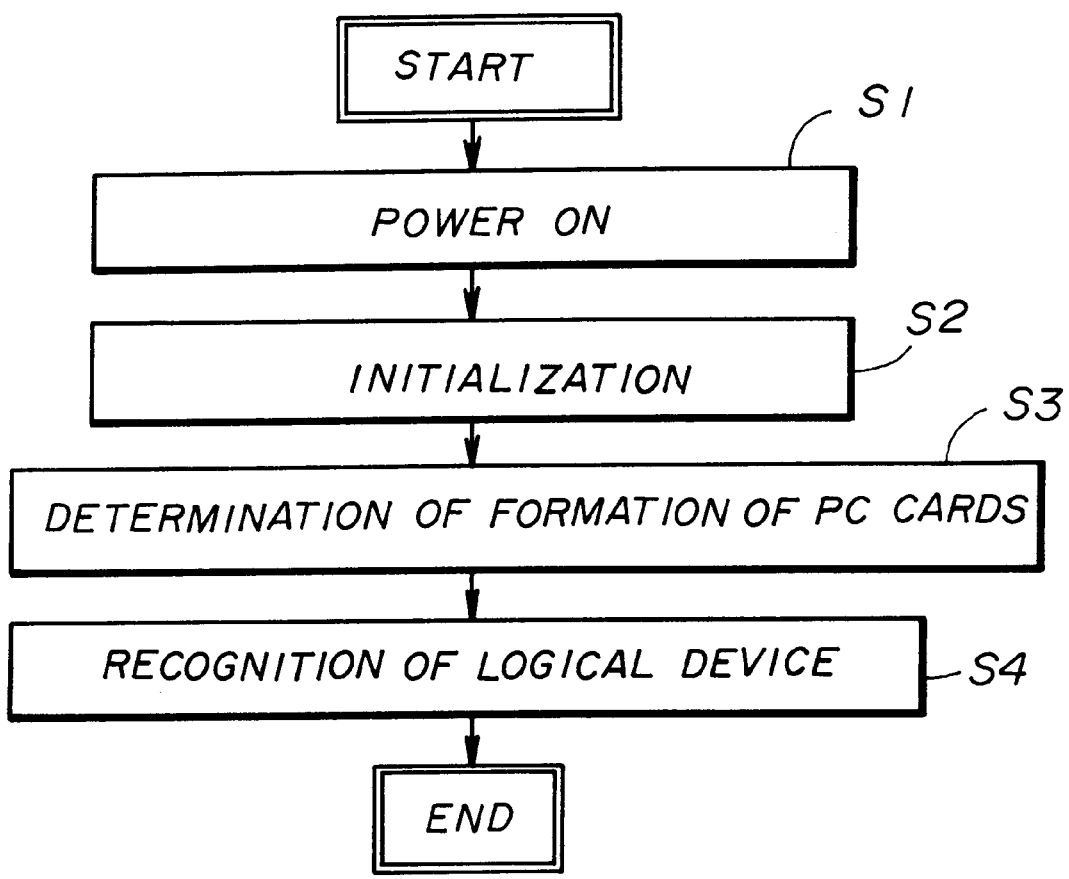
FIG. 10 is a flowchart illustrating a process executed by a disk array controller when the disk array apparatus starts.

After the hard disk cards 111 are completely set in all of the slots 110 of the card slot body 101, the card array controller 140 performs an initial process as shown in FIG. 10. Referring to FIG. 10, the card array controller 140 controls a switch unit (not shown) so that power is supplied to the respective hard disk cards 111 in step S1. The card array controller 140 then initializes the respective hard disk cards 111 in step S2. After this, the card array controller 140 communicates with the disk controllers (HDC) of the hard disk cards 111 one by one, and determines what types of PC cards are set in the slots 110 (formation of the PC cards set in the slots 110), in step S3. In this case, the card array controller 140 determines that the hard disk cards 111 are set in all of the slots 110. The card array controller 140 recognizes, based on the formation of the PC cards determined in step S3, what logic devices are formed in the card array apparatus 100a, in step S4. In this case, since the hard disk cards 111 are set in all of the slots, the card array controller 140 recognizes that a single hard disk device (a logic device) is formed in the card array apparatus 100a. The recognition result obtained in step S4 is supplied from the card array controller 140 to the control system of the desktop computer 120. As a result, the control system of the desktop computer 120 recognizes that the hard disk device is connected thereto as a peripheral device.

Figure 11:
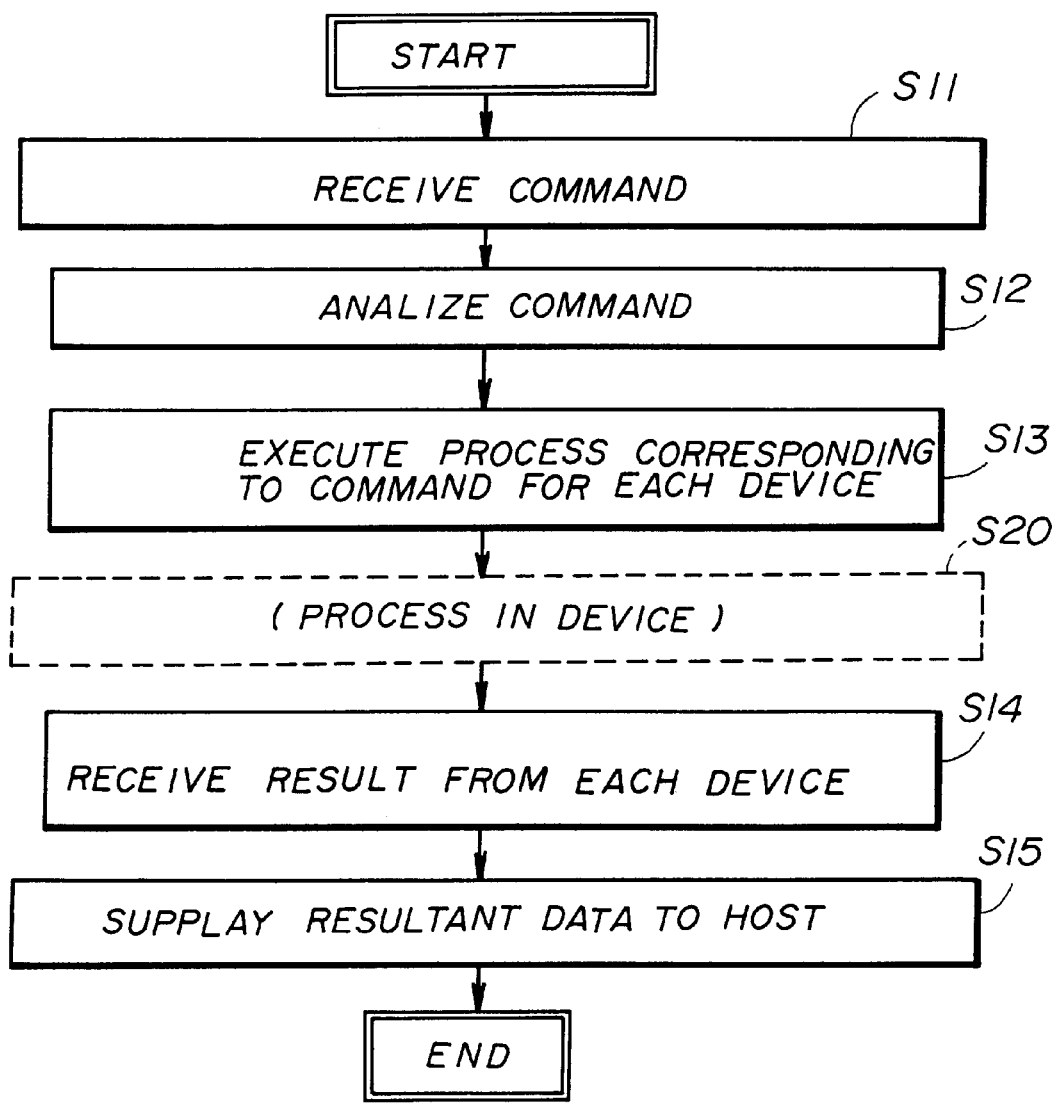
FIG. 11 is a flowchart illustrating a process executed by the disk array controller when receiving a command from a CPU of the personal computer.

After the initial process described above is completed, the card array controller 140 performs a process shown in FIG. 11 in response to a command from the control system of the desktop computer 120 (host computer).

Referring to FIG. 11, when the card array controller 140 receives a command from the host in step S11, the card array controller 140 analyzes the command in step S12. Based on the analyzing result, the card array controller 140 then executes a process corresponding to the command for each device which has been recognized as the logic device in the initial process, in step S13. For example, in a case where the host supplies a read command to the card array controller 140, the card array controller 140 executes, in accordance with the read command, a process for reading data from the hard disk device which has been recognized as the logic device in the initial process. That is, the card array controller 140 supplies a read instruction to a disk controller (HDC) of a hard disk card identified by information including the read command.

After this, the card array controller 140 waits for a response message from each device. In each device, a process is executed in response to an instruction based on the process executed by the card array controller 140 in step S13. In the above example, the disk controller (HDC) which receives the read instruction controls the disk drive unit (HDD) so that data is read out from a hard disk. The disk controller (HDC) supplies to the card array controller 140 the read data as a result in response to the read instruction.

When the card array controller 140 receives from each device a result obtained by each device in step S14, the card array controller 140 supplies resultant data to the host in step S15. That is, when the card array controller 140 receives the read data from the disk controller (HDC), the read data is supplied as the resultant data from the card array controller 140 to the host.

In a case where an error occurs in a PC card set in the card array apparatus, it is necessary for a user to be informed that an error has occurred in the PC card. Specifically, in the case of the disk array apparatus, when a grave error, such as a read/write impossibility, occurs in a hard disk card (the hard disk card malfunctions), the hard disk card must be changed. Thus, when an error occurs in a PC card set in the card array apparatus during the process shown in FIG. 11 as described above, the card array controller 140 executes a process shown in FIG. 12 so that ID information of the PC card in which an error has occurred is indicated by the state indicator 131.

Figure 12:
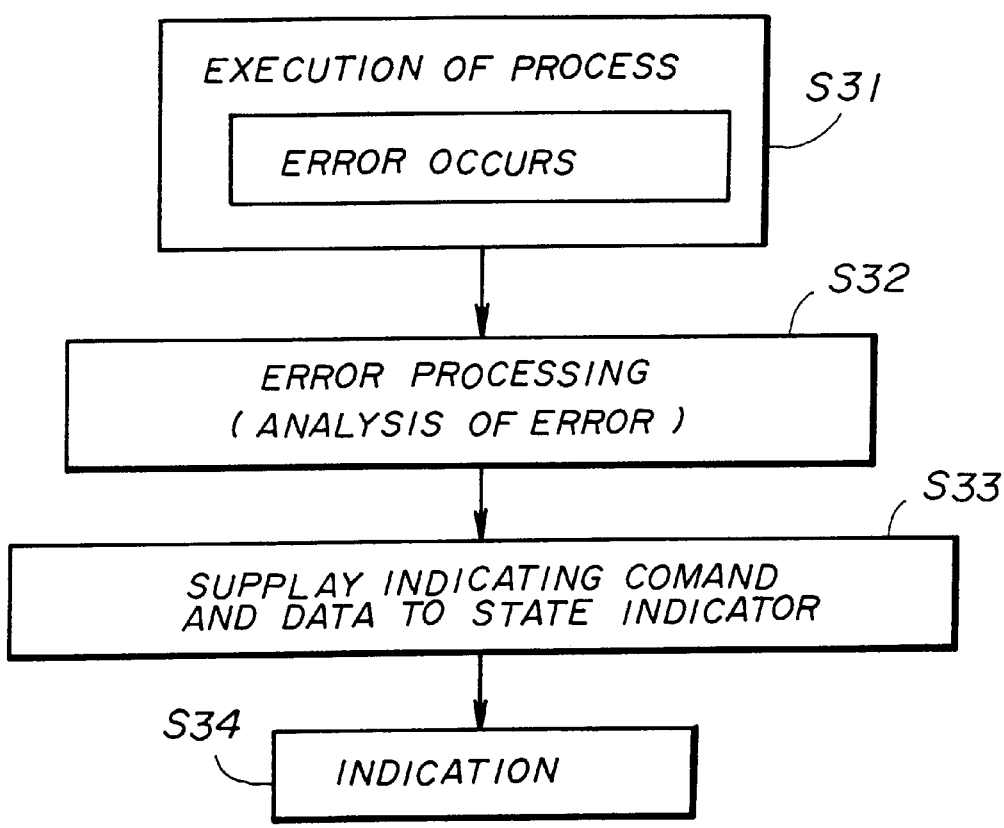
FIG. 12 is a flowchart illustrating a process executed by the disk array controller when an error occurs.

Referring to FIG. 12, the card array controller 140 periodically checks, in step S31, whether an error has occurred in each PC card (each hard disk card) while executing the process shown in FIG. 11. When the card array controller 140 detects that an error has occurred in a PC card (a hard disk card), the card array controller 140 executes an error processing in step S32. In the error processing, for example, an error is analyzed, the PC card (the hard disk card) is restarted or the like. Based on the result obtained by the error processing, the card array controller 140 supplies to the state indicator 131 an indication command and ID data specifying the PC card (the hard disk card) in which the error has occurred, in step S33. The state indicator 131 indicates, based on the indication command, the ID data.

For example, a slot number identifying a position of a slot in the card slot body 101 is used as the ID data identifying a PC card set in the slot. In this case, as shown in FIGS. 6A and 7A, A slot number "1" is indicated by the state indicator.

The user can recognize that a PC card (a hard disk card) identified by the ID data indicated by the state indicator 131 has malfunctioned. The user thus changes the PC card (the hard disk card) identified by the ID data. That is, in a state where the card array unit (the disk array unit) 100a is in the active state, the PC card (the hard disk card) which malfunctioned is removed from the slot 111 by operation of a corresponding eject button 133 and a substitute PC card (a substitute hard disk card) is then set in the slot 111.

According to the above embodiment, the disk array apparatus formed of a plurality of PC cards (hard disk cards) can be mounted in the expansion slot 123 or 124 which is typically provided in the desktop computer 120. The control system of the desktop computer 120 controls the disk array apparatus as a single hard disk device.

Figure 13:
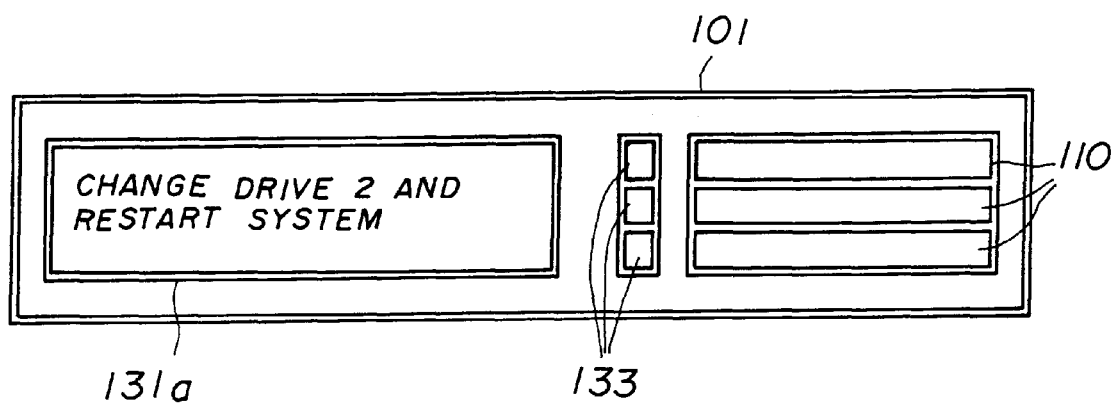
FIG. 13 is a diagram illustrating another example of an indicator of the disk array apparatus.

The state indicator 131 may also indicate a number identifying the type of error (e.g., a hardware error, a software error or the like) which has occurred in a PC card set in the card array apparatus. Further, the state indicator 131 may have a large indication area as shown in FIG. 13. In this case, the state indicator 131 is made, for example, of a LCD (Liquid Crystal Display) unit. A message which recommends the user to change a PC card, or a message regarding operations which should be performed by the user, may be indicated in the indication area of the state indicator 131.

The PC card has been developed as a unit which can be easily set in and removed from the slots of the card slot body 101. However, in the disk array apparatus which must have a high reliability, the hard disk card (the PC card) must be prevented from being easily removed from the slots of the card slot body 101. In light of this matter, a locking mechanism for preventing the hard disk cards from being easily removed from the slots is mounted on the disk array apparatus as will be described below.

Figure 14A:
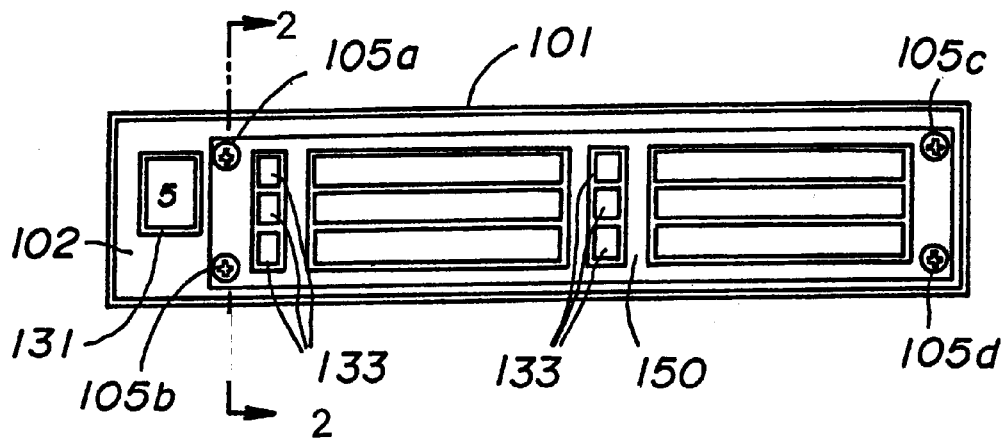
FIG. 14A is a diagram illustrating an example of the disk array apparatus having a locking mechanism.
Figure 14B:
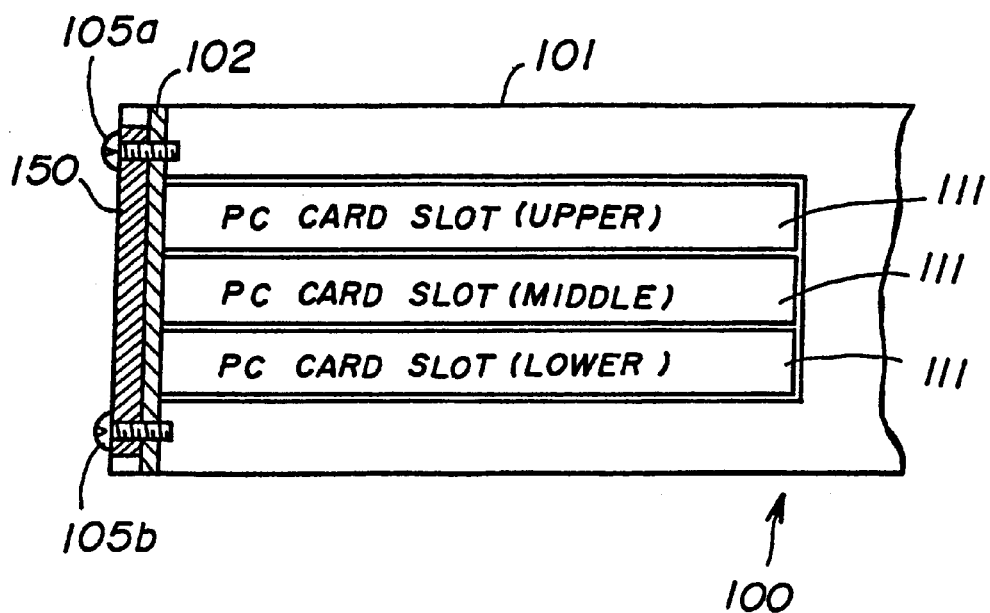
FIG. 14B is a cross sectional view taken along line 2—2 shown in FIG. 14A.

Referring to FIGS. 14A and 14B, a cover plate 150 is provided on a front surface 102 of the card slot body 101 so as to cover the slots 111 and eject buttons 133. The cover plate 150 is fixed on the front surface 102 by screws 105*a*, 105*b*, 105*c* and 105*d*. Since the eject buttons 133 are covered by the cover plate 150, the eject buttons 133 cannot be operated and the user cannot touch the hard disk cards set in the slots 111. Thus, the hard disk cards set in the slots 111 cannot removed from the slots 111.

In a case where a PC card set in the slot 111 is changed, the cover plate 150 is released from the screws 105*a*, 105*b*, 105*c* and 105*d* so as to be removed from the front surface 102 of the card slot body 101.

Figure 15:
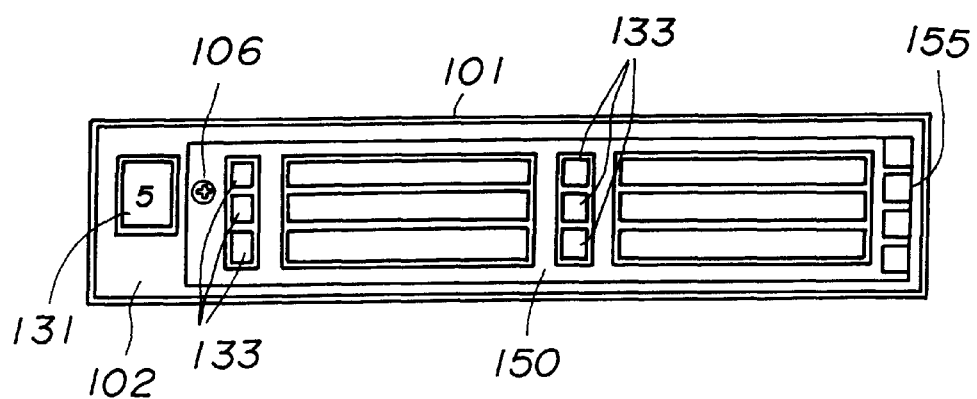
FIG. 15 is a diagram illustrating another example of the disk array apparatus having a locking mechanism.

The locking mechanism may be formed as shown in FIG. 15. Referring to FIG. 15, a side of the cover plate 150 is fixed on the front surface 102 of the card slot body 101 using a hinge 155. Thus, the cover plate 150 is pivoted on the hinge 155. A locking device 106 which can be in a locked state and in an unlocked state is mounted on the opposite side of the cover plate 150. When the locking device 106 is in the locked state, the cover plate 150 cannot be pivoted. In this state, the hard disk cards set in the slots 111 cannot be removed from the slots 111. On the other hand, when the locking device 105 is in the unlocked sate, the cover plate 150 can be pivoted on the hinge 155 so that the eject buttons 133 and the hard disk cards are exposed. In this state, the hard disk cards can be removed from the slots 111 by operations of the eject buttons 133.

Figure 16:
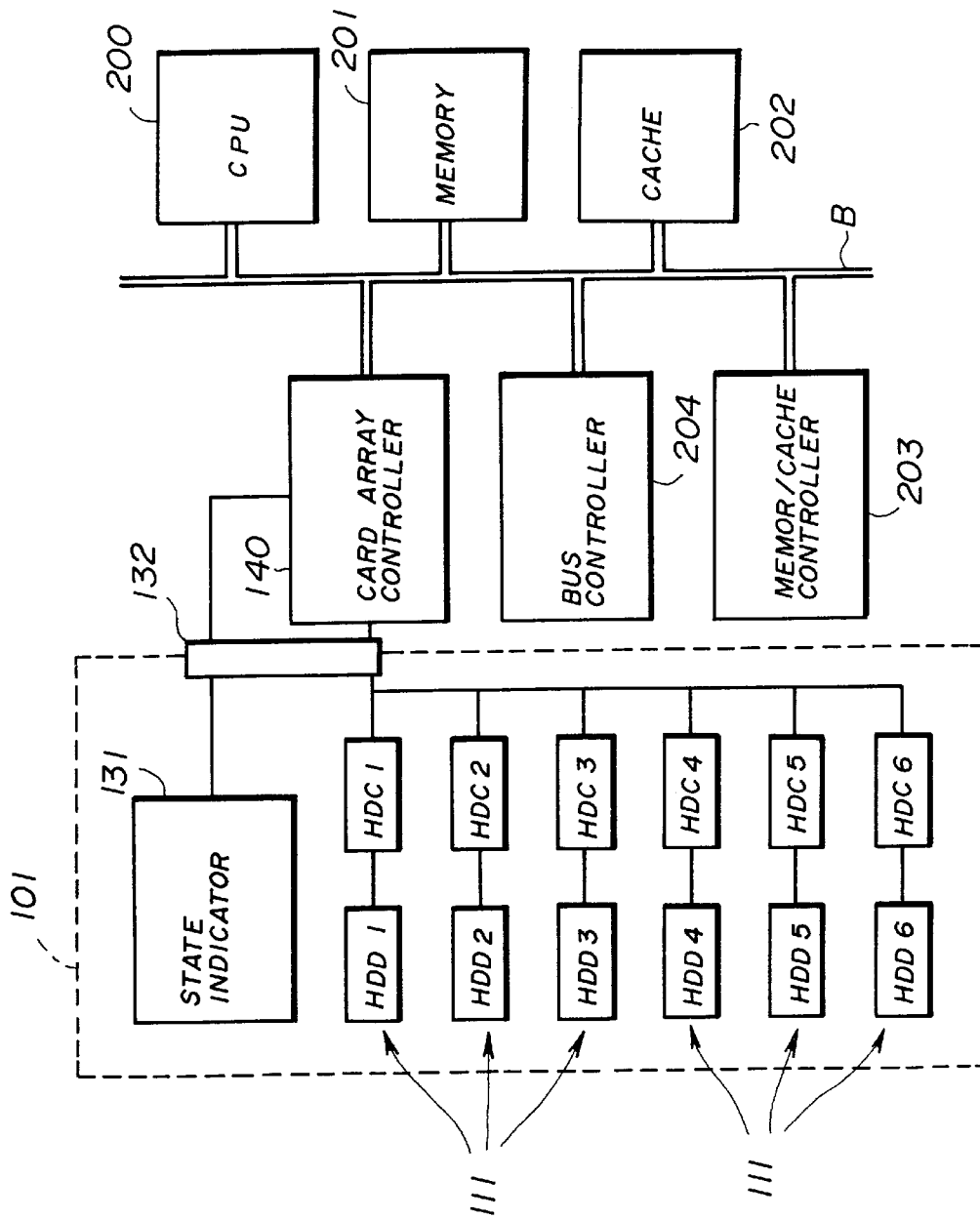
FIG. 16 is a block diagram illustrating another aspect of the disk array apparatus and the personal computer which are coupled to each other.

In the above embodiments, the card array controller 140 is provided in the card slot body 101 as shown in FIG. 9. However, the present invention is not limited to this aspect. The card array controller 140 may be provided in the desktop computer 120 which controls the card array apparatus 100*a* as a peripheral device, as shown in FIG. 16. In FIG. 16, those parts which are the same as those shown in FIG. 9 are given the same reference numbers. Referring to FIG. 16, the card array controller 140 provided in the desktop computer 120 is directly connected to the bus B of the control system of the desktop computer 120. The state indicator 131 and the card connectors to which the respective PC cards are connected are coupled to the card array controller via the connector 132 mounted on the rear surface of the card slot body 101.

The present invention is not limited to the aforementioned embodiments, and other variations and modifications may be made without departing from the scope of the claimed invention.

What is claimed is:

1. A computer comprising:
a card array apparatus; and
a control system to control said card array apparatus, wherein said card array apparatus comprises:
a card slot body having slots to receive a plurality of PC cards; and
a card control unit controlling access to said plurality of PC cards set in the slots of said card slot body as a disk array system based on a command supplied from said control system, wherein it is determined whether a PC card inserted in one of the slots should be used to configure the disk array system and, if the PC card should be used to configure the disk array system, the PC card is connected so as to configure the disk array system.

2. The computer as claimed in claim 1, wherein said card slot body and card control unit are integrated with each other.

3. The computer as claimed in claim 1, wherein said card slot body and said card control unit are provided in a main unit of said computer so as to be separated from each other.

4. The computer as claimed in claim 1, wherein said card array apparatus further comprises:
an error detector detecting a PC card in which an error has occurred; and
an indicator indicating information regarding the PC card detected by said error detector.

5. The computer as claimed in claim 1, wherein said card array apparatus further comprises:
a mechanism removing said plurality of PC cards set in said slots of said card slot body therefrom.

6. The computer as claimed in claim 1, wherein a main body of said card apparatus is provided in an expansion slot which is typically formed in said computer.

7. The computer as claimed in claim 1, wherein said plurality of PC cards operate as a disk unit.

8. An apparatus comprising:
a personal computer having a plurality of slots to receive a plurality of PC cards; and
a control unit controlling access to said plurality of PC cards as a disk array system based on a command from said personal computer, wherein it is determined whether a PC card inserted in one of the slots should be used to configure the disk array system and, if the PC card should be used to configure the disk array system, the PC card is connected so as to configure the disk array system.

9. The card array apparatus as claimed in claim 8, wherein said plurality of PC cards are operated as a disk unit.

10. A card controller controlling access to a plurality of PC cards inserted into slots of a computer, comprising:
a receiver receiving a command; and
a controller controlling access to said plurality of PC cards as a disk array system based on the command received by said receiver, wherein it is determined whether a PC card inserted in one of the slots should be used to configure the disk array system and, if the PC card should be used to configure the disk array system, the PC card is connected so as to configure the disk array system.

11. A card controlling method for controlling access to a plurality of PC cards inserted into slots of a computer, comprising:
receiving a command; and
controlling access to said plurality of PC cards as a disk array system based on the received command, wherein it is determined whether a PC card inserted in one of the slots should be used to configure the disk array system and, if the PC card should be used to configure the disk array system, the PC card is connected so as to configure the disk array system.

12. A processor readable medium storing a program for causing a computer to control access to a plurality of PC cards inserted into slots of the computer, comprising:
receiving program code means for receiving a command; and control program code means for controlling access to said plurality of PC cards as a disk array system based on the received command, wherein it is determined whether a PC card inserted in one of the slots should be used to configure the disk array system and, if the PC card should be used to configure the disk array system, the PC card is connected so as to configure the disk array system.

13. A card array apparatus comprising:

a card slot body having slots to receive a plurality of PC cards; and a card control unit controlling access to said plurality of PC cards in the slots of said card slot body, wherein it is determined whether a PC card inserted in one of the slots should be used to configure a disk array system and, if the PC card should be used to configure the disk array system, the PC card is connected so as to configure the disk array system.

14. A computer comprising:

a card array apparatus; and a control system to control said card array apparatus, wherein said card array apparatus comprises:

a card slot body having slots to receive a plurality of PC cards; and a card control unit controlling access to said plurality of PC cards set in the slots of said card slot body based on a command supplied from said control system, wherein it is determined whether a PC card inserted in one of the slots should be used to configure a disk array system and, if the PC card should be used to configure the disk array system, the PC card is connected so as to configure the disk array system.

15. A card controller controlling access to a plurality of PC cards set in slots comprising:

a receiver receiving a command; and a controller controlling access to said plurality of PC cards set in the slots based on the command received by said receiver, wherein it is determined whether a PC card inserted in one of the slots should be used to configure a disk array system and, if the PC card should be used to configure the disk array system, the PC card is connected so as to configure the disk array system.

16. A card controlling method for controlling access to a plurality of PC cards set in slots, comprising:

receiving a command; and controlling access to said plurality of PC cards set in the slots based on the received command, wherein it is determined whether a PC card inserted in one of the slots should be used to configure a disk array system and, if the PC card should be used to configure the disk array system, the PC card is connected so as to configure the disk array system.

17. A processor readable medium storing a program for causing a computer to control access to a plurality of PC cards set in slots, comprising:

receiving program code means for receiving a command; and control program code means for controlling access to said plurality of PC cards set in the slots based on the received command, wherein it is determined whether a PC card inserted in one of the slots should be used to configure a disk array system and, if the PC card should be used to configure the disk array system, the PC card is connected so as to configure the disk array system.

18. A card array apparatus comprising:

a card slot body having slots to receive a plurality of PC cards; and a card control unit controlling access to said plurality of PC cards set in the slots of said card slot body as a disk array system, wherein it is determined whether a PC card inserted in one of the slots should be used to configure the disk array system and, if the PC card should be used to configure the disk array system, the PC card is connected so as to configure the disk array system.

19. The card array apparatus as claimed in claim 18, wherein said card slot body and said card control unit are integrated with each other.

20. The card array apparatus as claimed in claim 18, further comprising:

an error detector detecting a PC card in which an error has occurred; and an indicator indicating information regarding the PC card detected by said error detector.

21. The card array apparatus as claimed in claim 18, further comprising;

a mechanism removing said plurality of PC cards set in said slots of said card slot body therefrom.

22. The card array apparatus as claimed in claim 18 wherein a main body of said card array apparatus has dimensions substantially corresponding to dimensions of an expansion slot of a typical personal computer.

23. The card array apparatus as claimed in claim 18, wherein said card control unit controls access to said plurality of PC cards set in the slots of said card slot body based on a command from an external system.

* * * * *